United States Patent
Jung et al.

(10) Patent No.: US 8,421,983 B2
(45) Date of Patent: Apr. 16, 2013

(54) LIQUID CRYSTAL DISPLAY (LCD) PANEL AND METHOD OF MANUFACTURING THE SAME

(75) Inventors: Sun-Kyo Jung, Yongin (KR); Ji-Ryun Park, Yongin (KR); Eun-Young Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 336 days.

(21) Appl. No.: 12/829,635

(22) Filed: Jul. 2, 2010

(65) Prior Publication Data

US 2011/0141427 A1  Jun. 16, 2011

(30) Foreign Application Priority Data

Dec. 15, 2009  (KR) .................. 10-2009-0125060

(51) Int. Cl.
*G02F 1/1339*  (2006.01)

(52) U.S. Cl.
USPC .......................................... 349/153

(58) Field of Classification Search .............. None
See application file for complete search history.

(56) References Cited

U.S. PATENT DOCUMENTS

| | | | |
|---|---|---|---|
| 6,552,764 B2 * | 4/2003 | Fujioka et al. | 349/106 |
| 7,202,931 B2 * | 4/2007 | Chung et al. | 349/153 |
| 7,593,089 B2 | 9/2009 | Huang et al. | |
| 8,120,743 B2 * | 2/2012 | Katsumura et al. | 349/153 |
| 2007/0216848 A1 | 9/2007 | Huang et al. | |
| 2007/0291216 A1 | 12/2007 | Chan et al. | |
| 2008/0062374 A1 * | 3/2008 | Katsumura et al. | 349/153 |

FOREIGN PATENT DOCUMENTS

| | | |
|---|---|---|
| JP | 09-197417 | 7/1997 |
| KR | 1020020064581 A | 8/2002 |
| KR | 10-2003-0070262 | 8/2003 |
| KR | 10-2007-0070706 | 7/2007 |
| KR | 10-2008-0004951 | 1/2008 |
| KR | 1020080082079 A | 9/2008 |
| KR | 10-2008-0111090 | 12/2008 |
| KR | 10-2009-0027257 | 3/2009 |
| KR | 10-0887634 | 3/2009 |

* cited by examiner

*Primary Examiner* — Sung Pak
(74) *Attorney, Agent, or Firm* — Robert E. Bushnell, Esq.

(57) ABSTRACT

A liquid crystal display panel comprises an upper substrate including a plurality of color filters, a lower substrate comprising a plurality of circuit lines, and a sealant for adhering the upper substrate and the lower substrate to each other. A seal area black matrix transmitting ultraviolet (UV) light rays for curing the sealant is formed in the upper substrate. The seal area black matrix is formed by stacking the plurality of color filters in a seal area.

14 Claims, 8 Drawing Sheets

LIQUID CRYSTAL DISPLAY (LCD) PANEL AND METHOD OF MANUFACTURING THE SAME

CLAIM OF PRIORITY

This application makes reference to, incorporates the same herein, and claims all benefits accruing under 35 U.S.C. §119 from an application earlier filed in the Korean Intellectual Property Office on 15 Dec. 2009 and there duly assigned Serial No. 10-2009-0125060.

BACKGROUND OF THE INVENTION

1. Field of the Invention

The present invention relates generally to a liquid crystal display (LCD) panel and a ii method of manufacturing the same and, more particularly, to an LCD panel and a method of manufacturing the same which are capable of fully curing a sealant within the LCD panel through blanket exposure.

2. Description of the Related Art

A liquid crystal display (LCD) includes two substrates, in each of which an electric field generation electrode is formed. Surfaces in which the two electrodes are formed are disposed to face each other, and liquid crystal material is injected between the two substrates. The LCD displays an image by controlling transmittance of light which varies according to liquid crystal molecules which are moved by an electric field generated by supplying voltage to the two electrodes.

The LCD panel of a conventional LCD comprises a lower substrate including a plurality of elements, an upper substrate including color filters, and a sealant interposed between the upper substrate and the lower substrate in order to adhere the two substrates.

The sealant is used to attach the two substrates to each other by curing curable resin using heat or ultraviolet rays. A method of curing the curable resin using heat includes a method of baking the curable resin by applying heat to the curable resin or a method of curing the curable resin using heat generated by pressurizing the two substrates in order to produce the sealant.

A method using a UV curable resin includes a method of coating the UV curable resin between the two substrates and radiating UV light to the UV curable resin so that the UV curable resin is cured by the UV light. The method using a UV curable resin has recently been widely used in order to form a sealant.

The method of forming a sealant using a UV curable resin is advantageous in that it can form the sealant within a relatively short period of time through a chemical reaction of ultraviolet rays emitted from a UV curing apparatus and can also cure the UV curable resin at low temperature.

The method of forming a sealant using a UV curable resin is also advantageous in that it can reduce the energy costs because, unlike the method using heat, baking is not required when curing the UV curable resin.

Meanwhile, the conventional method of curing a UV curable resin using ultraviolet rays comprises a method of curing the UV curable resin interposed between the upper substrate and the lower substrate through the lower substrate from the lower portion of the lower substrate.

In this method, after a chromium oxide (CrOx) film for covering circuit lines is deposited, a black matrix is formed on the entire surface of a circuit area through, for example, photoresist and etching processes. Accordingly, the UV curable resin cannot be cured through the upper substrate because the upper substrate does not transmit ultraviolet rays. For the above reason, in the prior art, the method of curing a UV curable resin through the lower substrate is used.

The black matrix is not formed in the lower substrate of the conventional LCD panel, but a plurality of the circuit lines for driving an LCD panel is formed in the lower substrate of the conventional LCD panel.

In the case in which the two substrates are attached to each other by curing the UV curable resin provided in a seal area, although ultraviolet rays are radiated through the lower substrate, the UV curable resin is not sufficiently radiated with the ultraviolet rays because of the circuit lines. Accordingly, there is a problem in that some areas of the UV curable resin are not cured.

Furthermore, if the time that it takes to radiate the ultraviolet rays is increased in order to sufficiently cure the UV curable resin, the time that it takes to cure the UV curable resin is increased. Accordingly, problems arise because the tact time of the LCD panel is increased, and so the product output is reduced.

There is another problem in that space is limited in designing the circuit area in order to increase the amount of UV radiation in the case in which the ultraviolet rays are radiated through the lower substrate.

The above information disclosed in this "Related Art" section is only for enhancement of an understanding of the background of the described technology and therefore it may contain information that does not form the prior art known in this country to a person of ordinary skill in the art.

SUMMARY OF THE INVENTION

The present invention has been developed in an effort to provide a liquid crystal display (LCD) having the advantage of 100% securing a UV aperture area for curing a seal area.

One embodiment provides a liquid crystal display (LCD) having the advantage of preventing insufficient curing of a sealant.

Another embodiment provides a liquid crystal display (LCD) having the advantage of overcoming a limitation in designing the circuit lines of an LCD panel.

An exemplary embodiment provides a liquid crystal display (LCD) panel, comprising an upper substrate including a plurality of color filters, a lower substrate including a plurality of circuit lines, and a sealant adhering the upper substrate and the lower substrate to each other. A seal area black matrix transmitting ultraviolet (UV) light rays for curing the sealant is formed in the upper substrate, and the seal area black matrix is formed by stacking the plurality of color filters in a seal area.

The upper substrate may comprise a pixel area black matrix for preventing mixing colors of the plurality of color filters.

The plurality of color filters comprises red (R), green (G), and blue (B) color filters.

The sealant is formed in the outer circumference of the upper substrate and the lower substrate.

The seal area black matrix may have a width wider than that of the sealant.

The seal area black matrix may filter only a visible ray region.

The seal area black matrix may have a thickness corresponding to a thickness of the plurality of color filters.

Another exemplary embodiment provides a method of manufacturing a liquid crystal display (LCD) panel, comprising the steps of providing a lower substrate comprising a pixel area and a circuit area, forming a first black matrix on the upper substrate comprising the pixel area and the circuit area, forming a pixel pattern and a seal area pattern by patterning the first black matrix, forming a plurality of color filter patterns at respective places corresponding to the pixel pattern on the upper substrate by sequentially coating a plurality of color resins on the pixel pattern, forming a seal area black matrix in a region corresponding to the seal area pattern on an upper substrate by sequentially stacking a plurality of color resins in the seal area pattern, coating a UV curable resin on any one of the upper substrate and the lower substrate so that the UV curable resin corresponds to the seal area black matrix, making the upper substrate and the lower substrate come into contact with the UV curable resin, and curing the UV curable resin by radiating UV light at the UV curable resin through the seal area black matrix of the upper substrate, thereby adhering the upper substrate and the lower substrate to each other.

The plurality of color filters may comprise R, G, and B color filters.

The first black matrix may be formed by depositing a chromium oxide (CrOx) film on the upper substrate, and then performing photoresist and etching processes.

The step of forming the plurality of color filter patterns and the step of forming the seal area black matrix may be simultaneously performed.

The plurality of color resins may be formed such that a thickness of the plurality of color resins is controlled by performing exposure processing using a half-tone mask when the plurality of color resins is stacked in the seal area pattern.

The plurality of color resins may be formed such that a thickness of the plurality of color resins is controlled by performing exposure processing using a slit mask when the plurality of color resins is stacked in the seal area pattern.

The seal area black matrix stacked in the seal area pattern may have a thickness corresponding to a thickness of the color filters formed in the pixel area.

In the LCD panel according to the exemplary embodiment, the UV aperture ratio of 100% can be secured through the upper substrate because the seal area black matrix is formed by stacking the RGB color filters. Accordingly, a UV curable resin can be fully cured.

Furthermore, the LCD panel according to the exemplary embodiment can prevent possible failure resulting from insufficient curing of a sealant.

In the method of manufacturing an LCD panel according to another exemplary embodiment, there is no limit to the design for the space and arrangement of circuit patterns in the lower substrate because a UV curable resin is cured using blanket exposure.

In the LCD panel according to the exemplary embodiment, an LCD panel equipped with a slim black matrix can be formed because the seal area black matrix can have a reduced width.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
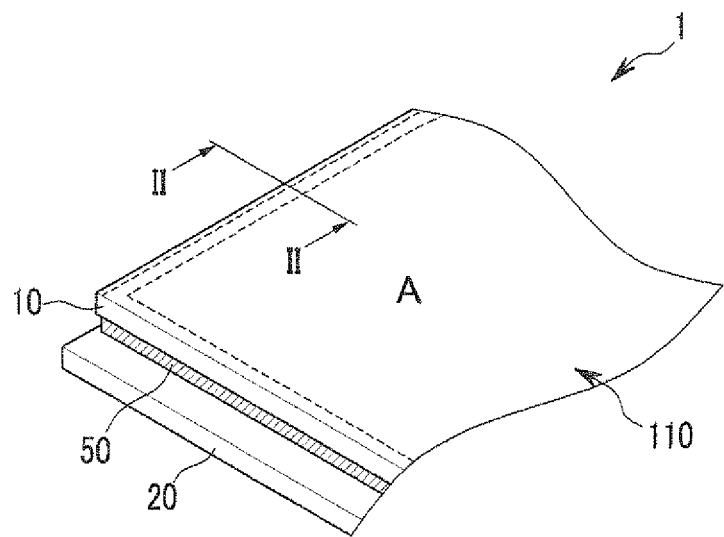
FIG. 1 is a perspective view of an LCD panel in accordance with an exemplary embodiment of the present application.

Hereinafter, some exemplary embodiments will be described with reference to the accompanying drawings in order for those skilled in the art to be able to readily implement them. As those skilled in the art will realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
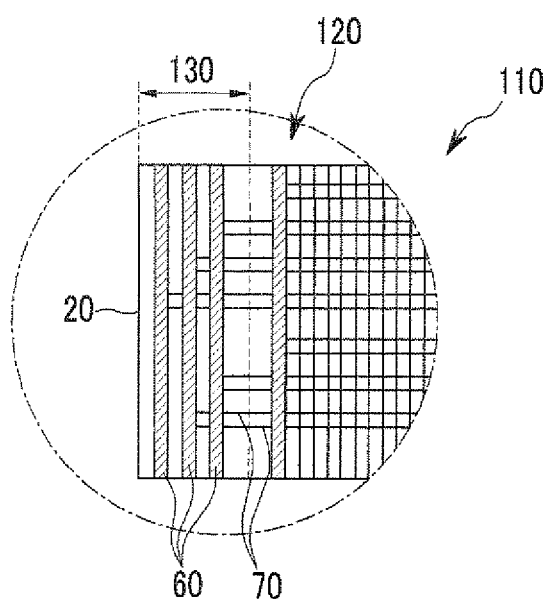
FIG. 2 is a top plan view of a lower substrate which is an enlarged view of an area A in FIG. 1.
Figure 3:
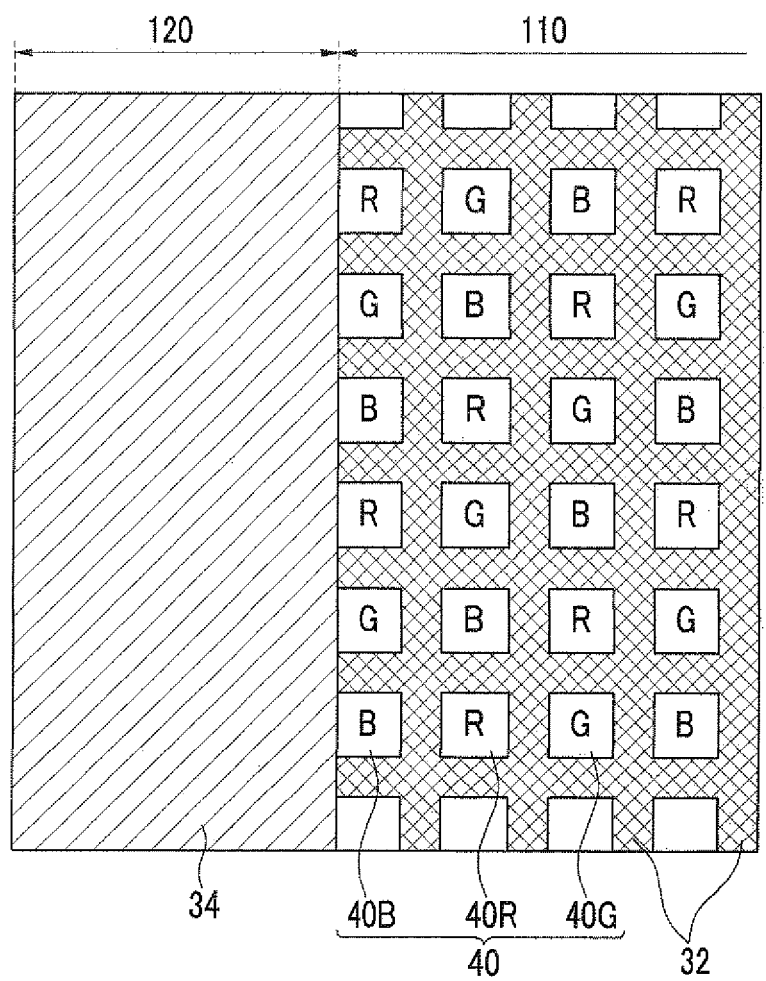
FIG. 3 is a top plan view of an upper substrate which is an enlarged view of the area A in FIG. 1.
Figure 4:
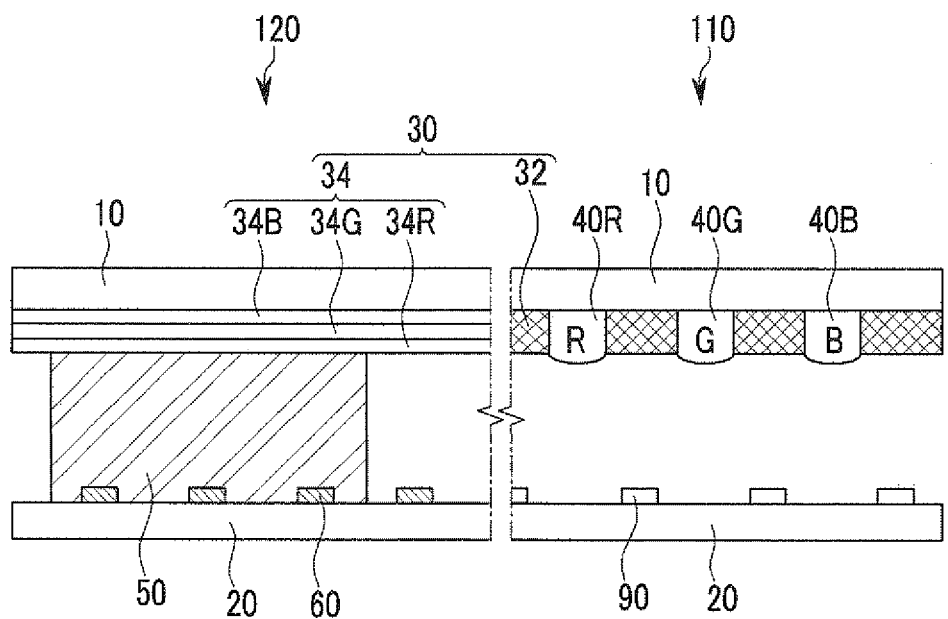
FIG. 4 is a partial cross-sectional view of the area A taken along line II-II in FIG. 1.

FIG. 1 is a perspective view of an LCD panel in accordance with an exemplary embodiment of the present application, FIG. 2 is a top plan view of a lower substrate which is an enlarged view of an area A in FIG. 1, FIG. 3 is a top plan view of an upper substrate which is an enlarged view of the area A in FIG. 1, and FIG. 4 is a partial cross-sectional view of the area A taken along line II-II in FIG. 1.

Referring to FIGS. 1 thru 4, the LCD panel 1 according to the exemplary embodiment includes an upper substrate 10, a lower substrate 20, a seal area black matrix 34, and a sealant 50.

A plurality of RGB color filters 40, a pixel area black matrix 32, and the seal area black matrix 34 are formed in the upper substrate 10, as seen in FIG. 3.

Referring to FIG. 2, the lower substrate 20 is provided with a pixel area 110 and a circuit area 120. The circuit area 120 refers to an area in which circuits for driving the LCD panel are formed, and the pixel area 110 refers to an area in which cells of a pixel unit, composed of the RGB color filters 40, are gathered to form an image.

A plurality of metal lines 90 (FIG. 4) is formed in the pixel area 110 of the lower substrate 20.

A plurality of circuit lines 60 (FIG. 4) for supplying driving signals is formed in the circuit area 120 of the lower substrate 20.

Link lines 70 (FIG. 2) connected to the circuit lines 60 are formed in the lower substrate 20. The link lines 70 supply signals to the metal lines 90 (FIG. 4) of the pixel area 110.

The circuit lines 60 (FIG. 4) provided in the circuit area 120 sequentially supply the plurality of metal lines 90 with a scanning signal (i.e., a gate high voltage signal VGH) in response to input control signals.

Furthermore, the circuit lines 60 supply the plurality of metal lines 90 with a gate low voltage signal VGL during the remaining period other than the periods in which the gate high voltage signal VGH is supplied.

The link lines 70 (FIG. 2) include a plurality of lines, respectively, for supplying voltage signals supplied by a power supply unit, such as the gate high voltage signals VGH, the gate low voltage signals VGH, a common voltage signal VCOM, a ground voltage signal GND, and a power source voltage signal VCC, and gate control signals supplied by a timing controller, such as a gate start pulse GSP, a gate shift clock signal GSC, and a gate enable signal GOE.

A seal area 130 (FIG. 2), in which the sealant 50 (FIG. 1) for attaching the upper substrate 10 and the lower substrate 20 to each other is disposed, is formed in the circuit area 120.

The seal area 130 is disposed so as to surround the outer circumference of the upper substrate 10 and the lower substrate 20

As seen in FIG. 2, the seal area 130 is formed within the circuit area 120.

Meanwhile, as best seen in FIG. 4, the circuit area 120 and the pixel area 110 are formed in the upper substrate 10 in respective corresponding regions of the lower substrate 20.

The pixel area black matrix 32 is formed in the pixel area 110 of the upper substrate 10 in a matrix form. The pixel area black matrix 32 is a constituent element for preventing mixing colors of a plurality of color filters.

A plurality of color filters 40R, 40G, and 40B (FIG. 4) having respective colors is disposed in the pixel area black matrix 32 at predetermined intervals. In the present exemplary embodiment, the plurality of color filters include red color filters 40R, green color filters 40G, and blue color filters 40B.

The pixel area black matrix 32 can be chiefly formed by depositing a chromium oxide (CrOx) film on the upper substrate 10, and then performing photoresist and etching processes.

On the other hand, referring to FIG. 3, the seal area black matrix 34 is formed in the circuit area 120 of the upper substrate 10. According to the present exemplary embodiment, the width of the seal area black matrix 34 is wider than the width of the sealant 50 (see FIG. 4).

Furthermore, the seal area black matrix 34 is formed so as to filter only a visible ray region. In other words, the seal area black matrix 34 is formed to transmit ultraviolet rays, but not to transmit a visible ray.

The seal area black matrix 34 is formed by stacking a plurality of color filters (i.e., RGB color filters 34R, 34G, and 34B), as seen in FIG. 4.

More particularly, the seal area black matrix 34 is not formed so as to have the same construction as the pixel area black matrix 32 in a process of manufacturing an LCD panel, but the seal area black matrix 34 is formed by sequentially stacking the color filters 34R, 34G, and 34B in the seal area 130 of the upper substrate 10 when the color filters are formed on the upper substrate 10, as seen in FIG. 4.

In the exemplary embodiment, the color filters 34R, 34G and 334B are sequentially stacked in the seal area 130 of the upper substrate 10 when they are formed in the pixel area of the upper substrate 10 upon manufacture of an LCD panel. However, the process of forming the seal area black matrix 34 by stacking the color filters 34R, 34G and 34B in the seal area 130 may be separately performed relative to the process of forming the color filters 40 in the pixel area 110.

Accordingly, according to the exemplary embodiment, the LCD panel 1 (FIG. 1) can include the pixel area black matrix 32 and the seal area black matrix 34 which are manufactured using different methods.

If the seal area black matrix 34 is formed by sequentially stacking the color filters 34R, 34G and 34B as described above, the RGB color filters 34R, 34G and 34B can be easily stacked because the seal area 130 is disposed at the outer circumference of the upper substrate 10 and the lower substrate 20. Furthermore, the seal area 130 has only to be seen as simply black because, unlike the pixel area, the seal area 130 is an area forming a black color edge which surrounds a display unit in a liquid crystal display (LCD).

If the seal area black matrix 34 is formed by stacking the color filters 34R, 34G and 34B as in the method of manufacturing an LCD panel according to the exemplary embodiment, ultraviolet rays can be radiated toward the entire surface of the upper substrate 10 in order to cure a UV curable resin disposed in the seal area 130.

In the method according to the exemplary embodiment, although the width of the seal area 130, in which the UV curable resin is disposed, is reduced, the cure rate of the UV curable resin is high, enabling robust sealing. Accordingly, the total width of the seal area black matrix 34 can be made narrower than the width of a conventional black matrix.

Furthermore, if the width of the seal area 130 is narrowed as described above, the curing time is reduced, and thus the time that it takes to manufacture an LCD panel can be reduced.

Meanwhile, the pixel area black matrix 32 is preferably not formed using a method of stacking color filters, such as in the method of forming the seal area black matrix 34, because the color filters 40R, 40G, and 40B have to be formed inside.

Furthermore, the thickness of the seal area black matrix 34 (i.e., a thickness in which the RGB color filters 34R, 34G, and 34B are stacked) is preferably similar to, or slightly thicker than, the thickness of each of the plurality of color filters 40R, 40G, and 40B formed in the pixel area black matrix 32. This is described in more detail later.

FIGS. 5A thru 5H are cross-sectional views illustrating a process of manufacturing the LCD panel in accordance with an exemplary embodiment of the present application.

A method of manufacturing the LCD panel 1 of FIG. 1 according to the exemplary embodiment is described below with reference to FIGS. 5A thru 5H.

Figure 5A:
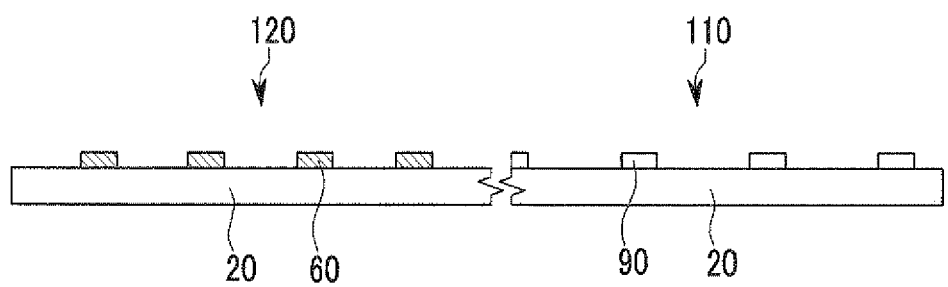
FIGS. 5A thru 5H are cross-sectional views illustrating a process of manufacturing the LCD panel in accordance with an exemplary embodiment of the present application.

First, as shown in FIG. 5A, the lower substrate 20 is equipped with the pixel area 110 and the circuit area 120. The plurality of metal lines 90 is formed in the pixel area 110 of the lower substrate 20, and the plurality of circuit lines 60 is formed in the circuit area 120 of the lower substrate 20.

Figure 5B:
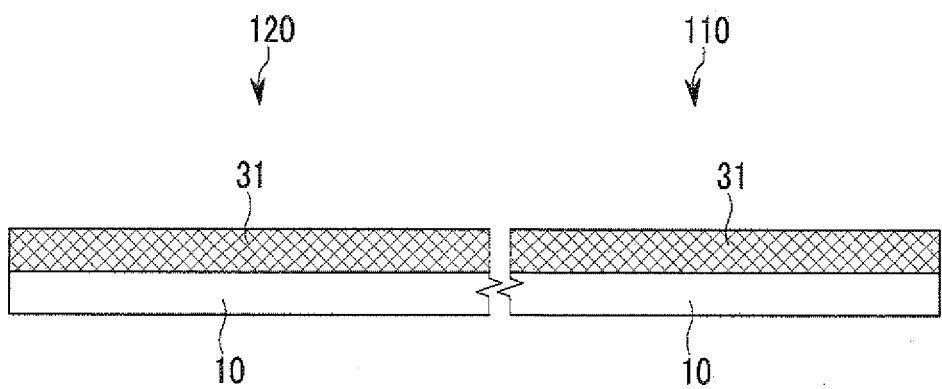

Next, as shown in FIG. 5B, a first black matrix 31 is formed on the entire surface of the upper substrate 10, including the pixel area 110 and the circuit area 120. The first black matrix 31 functions to shield the light. According to the present exemplary embodiment with reference to FIGS. 5B and 5C, the pixel area black matrix 32 is formed in a black matrix portion disposed in the pixel area 110 of the first black matrix 31. A black matrix portion, disposed in the circuit area 120 of the first black matrix 31, is removed in order to subsequently form the seal area black matrix 34 (FIG. 5F) in the corresponding portion.

The first black matrix 31 (FIG. 5B) can be chiefly formed by depositing a chromium oxide (CrOx) film on the upper substrate 10 and then performing photoresist and etching processes.

Figure 5C:
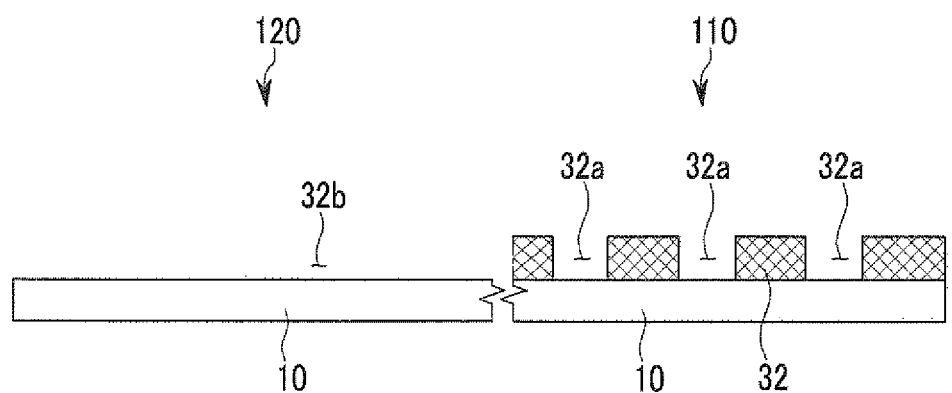

Next, as shown in FIG. 5C, a pixel pattern 32a and a seal area pattern 32b are formed in the first black matrix 31 by patterning the first black matrix 31 of the upper substrate 10 using a mask.

The pixel pattern 32a is a pattern in which the RGB color filters 40R, 40G, and 40B are disposed. The seal area pattern 32b is a pattern in which the first black matrix 31 is removed from the upper substrate 10 in order to form the seal area black matrix 34 of FIG. 5F by stacking the color filters 34R, 34G, and 34B in the seal area 130.

In the present exemplary embodiment, the first black matrix 31 of FIG. 5B formed on the seal area is removed in order to form the seal area pattern 32b of FIG. 5C. However, when the first black matrix 31 is first formed, the first black matrix 31 may not be formed in the seal area, and the seal area black matrix 34 of FIG. 5F may be formed by stacking the color filters 34R, 34G, and 34B in the seal area in a subsequent process.

Figure 5D:
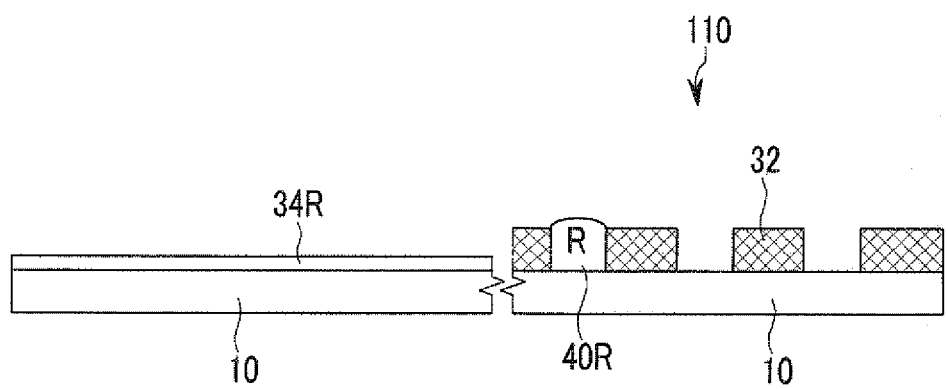
Figure 5E:
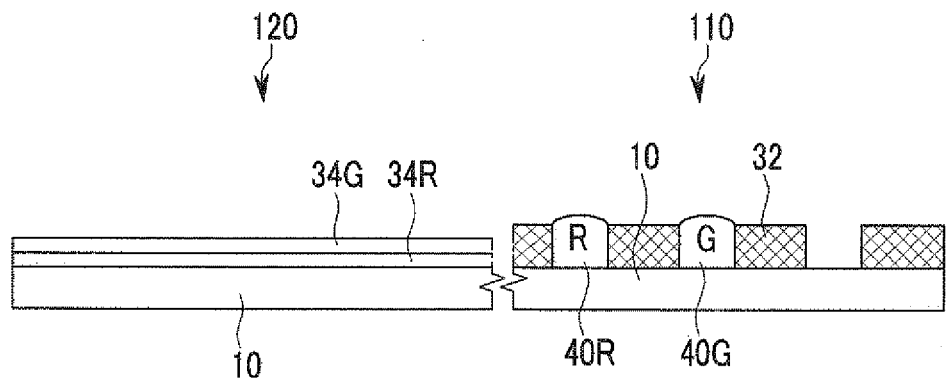
Figure 5F:
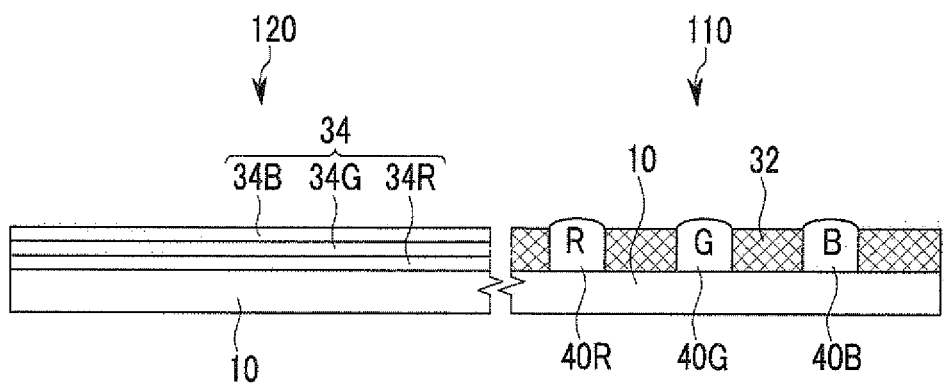
Figure 5G:
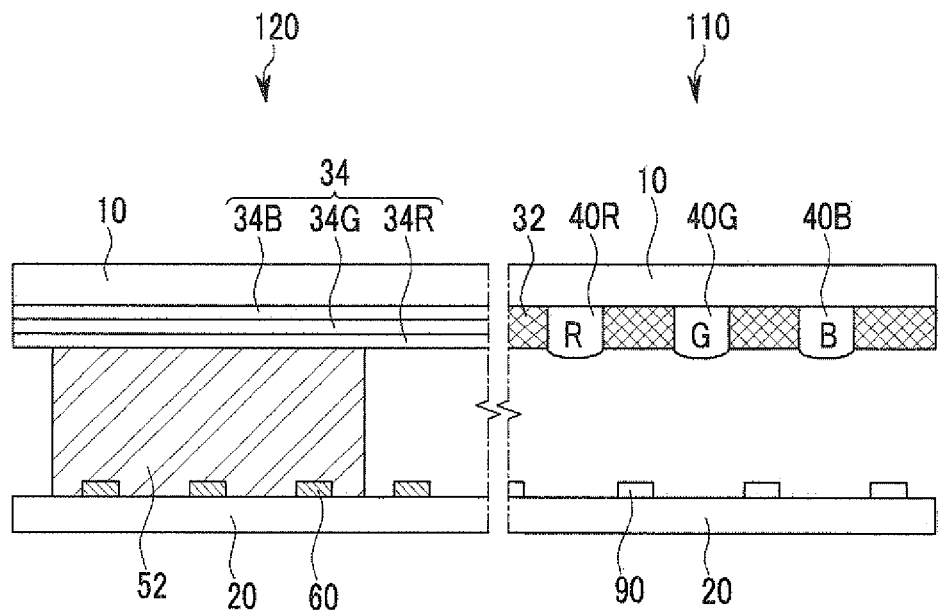

Next, as shown in FIGS. 5D thru 5F, the color filters 40R, 40G, and 40B are sequentially formed on the pixel pattern 32a.

While the color filters 40R, 40G, and 40B are formed on the pixel pattern 32a as described above, the RGB color filters 40R, 40G, and 40B are stacked on the pixel area 110 in the same order in which the color filters 34R, 34G, and 34B are formed on the seal area pattern 32b, thereby forming the seal area black matrix 34. Here, in the order in which the color filters are stacked, any one of the color filters may be first stacked.

The thickness of each of the plurality of color filters 34R, 34G, and 34B stacked in the seal area 130 is preferably thinner than the thickness of each of the color filters 40R, 40G, and 40B formed on the pixel pattern 32a.

If the three color filters 34R, 34G and 34B are stacked in the seal area 130 with the same thickness as a thickness in which the color filters 40R, 40G, and 40B are formed on the pixel area 110, the thickness of the seal area black matrix 34 formed in the seal area 130 is three times greater than the thickness 't' of the color filters 40R, 40G, and 40B formed in the pixel area 110.

If, as described above, the thickness of the seal area black matrix 34 is about three times greater than the thickness 't' of the pixel pattern, a total thickness of the LCD panel 1, including the seal area 130, is increased. Accordingly, the interval between the upper substrate 10 and the lower substrate 20 is undesirably widened.

When the LCD panel according to the present exemplary embodiment is manufactured, the thickness of the color filters 34R, 34G, and 34B stacked in the seal area 130 is reduced such that the thickness of the seal area black matrix 34 in which the plurality of color filters 34R, 34G and 34B is finally stacked is identical to or similar to the thickness of the color filters 40R, 40G, and 40B formed on the pixel area black matrix 32.

In order to make the thickness of the seal area black matrix 34 identical with the thickness of the color filters 34R, 34G and 34B formed on the pixel area black matrix 32 as described above, in the method of manufacturing the LCD panel according to the exemplary embodiment, the plurality of color filters 34R, 34G and 34B is stacked by exposure processing using a half-tone mask or exposure processing using a slit mask when the seal area black matrix 34 is formed in the seal area pattern 32b.

For example, the process of forming the plurality of color filters 40R, 40G, and 40B on the pixel area black matrix 32 can be performed as follows, but not limited thereto. A color resin having a red color from among red, green, and blue color resins is coated on the entire surface of the upper substrate 10 in which the pixel area black matrix 32 is formed. Next, the red color filters 40R are formed in desired areas by selectively performing an exposure processing on the red color resin.

After the green color resin is coated on the entire surface of the upper substrate 10 in which the red color filters 40R are formed, the green color filters 40G are formed in desired areas by selectively performing exposure processing on the green color resin.

After the blue color resin is coated on the entire surface of the upper substrate 10 in which the red and green color filters 40R and 40G are formed, the blue color filters 40B are formed in desired areas by selectively performing exposure processing on the blue color resin.

Figure 6A:
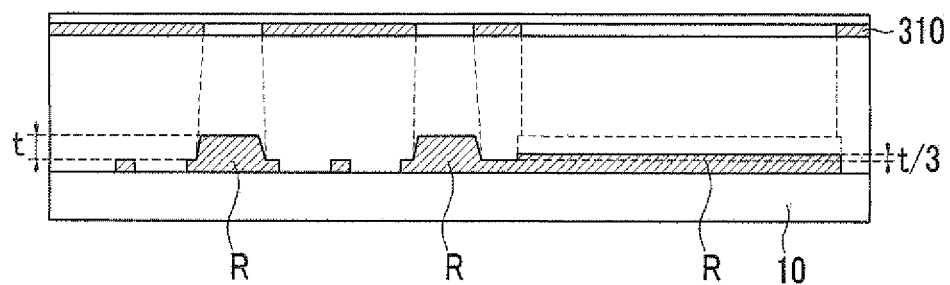
FIG. 6A is a cross-sectional view illustrating a method of manufacturing the black matrix of the LCD panel in accordance with an exemplary embodiment of the present application.
Figure 6B:
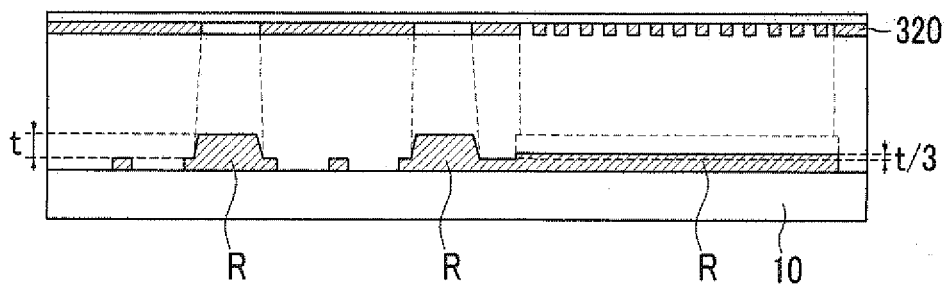
FIG. 6B is a cross-sectional view illustrating another method of manufacturing the black matrix of the LCD panel in accordance with an exemplary embodiment of the present application.

FIG. 6A is a cross-sectional view illustrating a method of manufacturing the black matrix of the LCD panel in accordance with an exemplary embodiment of the present application, and FIG. 6B is a cross-sectional view illustrating another method of manufacturing the black matrix of the LCD panel in accordance with an exemplary embodiment of the present application.

In the present exemplary embodiment, when exposure processing is performed on the color resin in order to form the seal area black matrix 34, a mask 310, enabling the exposure processing using a half-tone mask, may be used as shown in FIG. 6A. Alternatively, a mask 320 having slits formed therein, as shown in FIG. 6B, may be used in order to control the amount of color resin that has been exposed to light.

In the case in which exposure processing using a half-tone mask is performed, if the coated color resin is formed to a thickness 't' while being 100% exposed to light, the coated color resin can have a thickness of ⅓t in an area exposed using the half-tone mask (i.e., the seal area 130 in the present exemplary embodiment).

Furthermore, in the case in which exposure processing using a slit mask is performed, the amount of light passing through the mask is reduced. Accordingly, if color filters formed in areas in which slits are not disposed have a thickness 't', color filters formed in areas in which the slits are disposed have a thickness of ⅓t.

In the latter regard, the amount of light passing through the mask can be controlled by controlling the transmittance of the mask or the size of the slit. As described above, the thickness of the color filters can be controlled by controlling the amount of light radiated on the color resin.

After the seal area black matrix 34 is formed as described above, a UV curable resin 52 is coated on a region corresponding to the seal area black matrix 34 of any one of the upper substrate 10 and the lower substrate 20 using a dispenser.

The upper substrate 10 and the lower substrate 20 are brought into contact with the UV curable resin 52.

In the latter regard, the UV curable resin 52 is aligned so that it corresponds to the seal area black matrix 34 formed in the upper substrate 10. In order to align the UV curable resin 52 as described above, alignment keys may be used in the upper substrate 10 and the lower substrate 20.

Figure 5H:
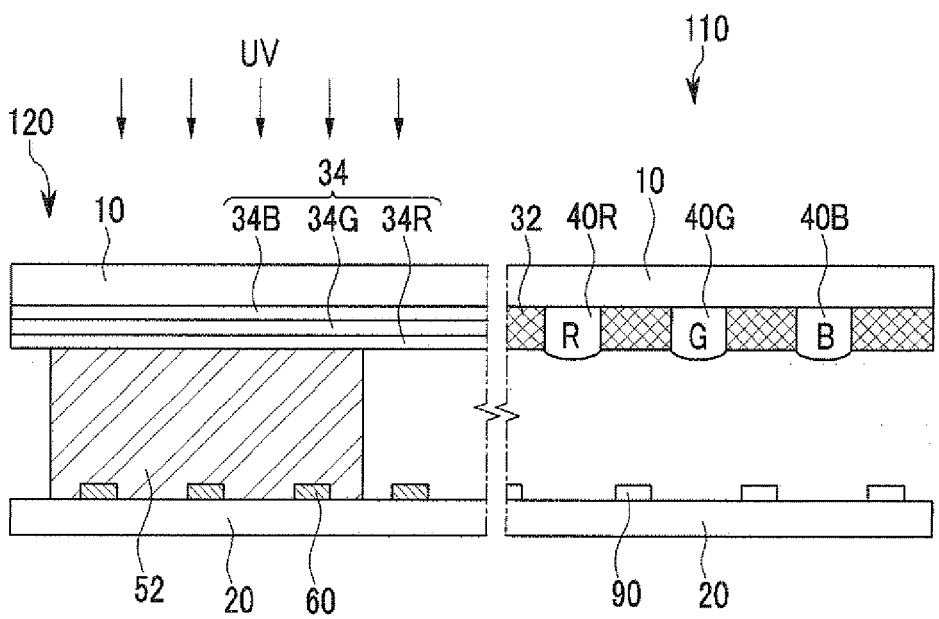

Next, as shown in FIG. 5H, ultraviolet rays (UV) are radiated toward the upper substrate 10 having the seal area black matrix 34 formed therein.

The seal area black matrix 34 is formed on the UV curable resin 52, but a circuit for shielding the ultraviolet rays is not formed on the UV curable resin 52. Thus, the ultraviolet rays can be fully radiated toward the UV curable resin 52 under the seal area black matrix 34.

Accordingly, the UV curable resin 52 can be cured within a short period of time.

Meanwhile, the quality of liquid crystals injected into the liquid crystal panel 1 may be changed because the ultraviolet rays may influence the liquid crystals. Accordingly, a shield film may be further provided in the pixel area 110 in order to prevent the ultraviolet rays from being radiated toward the liquid crystals.

The UV curable resin 52 is cured to form the sealant 50, thereby completing the coalescence of the upper and lower substrates 10 and 20, respectively.

As described above, in the LCD panel and the method of manufacturing the same according to the exemplary embodiments, the black matrix, transmitting ultraviolet rays but not transmitting a visible ray, is formed on the seal area 130 of the LCD panel 1 using the color filters. The UV curable resin 52 is cured by radiating the ultraviolet rays toward the upper substrate 10.

Accordingly, the UV curable resin 52 can be fully cured by the ultraviolet rays because it can be 100% exposed to light without a circuit wire for shielding the ultraviolet rays in the conventional back plate exposure method.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD) panel, comprising:
   a lower substrate including a plurality of circuit lines;
   an upper substrate including a pixel area which comprises a plurality of color filters disposed space-apart from each other by a pixel area black matrix, and a seal area on which a sealant is disposed to adhering the lower substrate and the upper substrate to each other, the seal area containing no pixel area black matrix; and
   a seal area black matrix formed on the seal area of the upper substrate by stacking the plurality of color filters, said seal area black matrix transmissive to ultraviolet light.

2. The LCD panel of claim 1, wherein the plurality of color filters comprises red (R), green (G), and blue (B) color filters.

3. The LCD panel of claim 1, wherein the sealant is formed in an outer circumference of the upper substrate and the lower substrate.

4. The LCD panel of claim 1, wherein the seal area black matrix has a width greater than a width of the sealant.

5. The LCD panel of claim 1, wherein the seal area black matrix blocks only a visible ray region.

6. The LCD panel of claim 1 wherein the seal area black matrix has a thickness corresponding to a thickness of the plurality of color filters.

7. A method of manufacturing an LCD panel, the method comprising the steps of:
   providing a lower substrate comprising a pixel area and a circuit area;
   forming a first black matrix on an upper substrate comprising the pixel area and the circuit area;
   forming a pixel pattern and a seal area pattern on the upper substrate by patterning the first black matrix;
   forming a plurality of color filter patterns at respective places corresponding to the pixel pattern on the upper substrate by sequentially coating a plurality of color resins on the pixel pattern;
   forming a seal area black matrix in a region corresponding to the seal area pattern on the upper substrate by sequentially stacking the plurality of color resins in the seal area pattern;
   coating an ultraviolet (UV) curable resin on any one of the upper substrate and the lower substrate so that the UV curable resin corresponds to the seal area black matrix;
   making the upper substrate and the lower substrate come into contact with the UV curable resin; and
   curing the UV curable resin by radiating UV light toward the UV curable resin through the seal area black matrix of the upper substrate, thereby adhering the upper substrate and the lower substrate to each other.

8. The method of claim 7, wherein the plurality of color filters comprises R, G, and B color filters.

9. The method of claim 7, wherein the first black matrix is formed by depositing a chromium oxide (CrOx) film on the upper substrate, and then performing photoresist and etching processes.

10. The method of claim 7, wherein the step of forming the plurality of color filter patterns and the step of forming the seal area black matrix are simultaneously performed.

11. The method of claim 7, wherein the plurality of color resins is formed in such a manner that a thickness of the plurality of color resins is controlled by performing an exposure processing using a half-tone mask when the plurality of color resins is stacked in the seal area pattern.

12. The method of claim 7, wherein the plurality of color resins is formed in such a manner that a thickness of the plurality of color resins is controlled by performing an exposure processing using a slit mask when the plurality of color resins is stacked in the seal area pattern.

13. The method of claim 7, wherein the seal area black matrix stacked in the seal area pattern has a thickness corresponding to a thickness of the color filters formed in the pixel area.

14. A liquid crystal display (LCD) panel, comprising:
   a lower substrate having a first seal area on which a plurality of circuit lines are disposed;
   an upper substrate including a plurality of color filters and a second seal area on which a sealant is disposed to adhering the lower substrate and the upper substrate to each other, the first seal area of the lower substrate aligned with the second seal area of the upper substrate; and
   a seal area black matrix formed in the second seal area of the upper substrate by stacking the plurality of color filters.

* * * * *